US008828338B2

(12) United States Patent
Lujano et al.

(10) Patent No.: US 8,828,338 B2
(45) Date of Patent: Sep. 9, 2014

(54) CONVERSION OF GASEOUS CARBON DIOXIDE INTO AQUEOUS ALKALINE AND/OR ALKALINE EARTH BICARBONATE SOLUTIONS

(75) Inventors: Juan Lujano, Caracas (VE); Javier Revete, Caracas (VE); Norma Valencia, Caracas (VE); Luis Rivas, Caracas (VE); Nelson Socorro, Caracas (VE)

(73) Assignee: Silica de Panama S.A., Caracas (VE)

( * ) Notice: Subject to any disclaimer, the term of this patent is extended or adjusted under 35 U.S.C. 154(b) by 0 days.

(21) Appl. No.: 13/136,153

(22) Filed: Jul. 25, 2011

(65) Prior Publication Data

US 2013/0028828 A1   Jan. 31, 2013

(51) Int. Cl.
| | | |
|---|---|---|
| *C01F 11/00* | (2006.01) | |
| *C01F 11/18* | (2006.01) | |
| *B01J 39/02* | (2006.01) | |
| *C01B 31/24* | (2006.01) | |
| *C01D 7/00* | (2006.01) | |
| *B01J 49/00* | (2006.01) | |
| *B01J 39/14* | (2006.01) | |

(52) U.S. Cl.
CPC .............. *C01D 7/00* (2013.01); *C01F 11/181* (2013.01); *B01J 39/02* (2013.01); *C01B 31/24* (2013.01); *C01F 11/18* (2013.01); *C01P 2002/82* (2013.01); *B01J 49/0069* (2013.01); *C01P 2002/72* (2013.01); *B01J 49/0008* (2013.01); *B01J 39/14* (2013.01)
USPC ........... 423/157; 423/158; 423/165; 423/181; 423/184; 423/189

(58) Field of Classification Search
USPC ................. 423/157, 158, 165, 181, 184, 189; 210/670
See application file for complete search history.

(56) References Cited

U.S. PATENT DOCUMENTS

| 560,224 | A | 5/1896 | Lincoln | |
|---|---|---|---|---|
| 2,227,520 | A | 1/1941 | Tiger | |
| 2,397,575 | A | 4/1946 | Tiger et al. | |
| 2,656,245 | A | 10/1953 | Kenneth et at | |
| 7,749,476 | B2 * | 7/2010 | Constantz et al. | 423/430 |
| 2011/0203174 | A1 | 8/2011 | Lackner | |

FOREIGN PATENT DOCUMENTS

GB   560224 A   3/1944

OTHER PUBLICATIONS

Roland et al, Zeolites, Ullmann's Encyclopedia of Industrial Chemistry, pp. 1-31, Jun. 15, 2000.
Lamb, III, Water Quality and Its Control, John Wiley & Sons, pp. 122-140, 1985.
Shreve, The Chemical Process Industries, Second Edition, McGraw-Hill Book Company, Inc., pp. 44-51, 1956.
Oblad et al, Advances in Catalysis, vol. III, Academics Press Inc., pp. 199-247, 1951.
Hellferich, Ion Exchange, Dover Publications, Inc., pp. 17-18, 1995.
Kodama et al, Preparation and Characterization of Cation Exchanger Using Meso-Carbon Microbeads Prepared by Emulsion Method, Carbon 28 (1), pp. 199-205, 1990.
Marubini et al, Bicarbonate Addition Promotes Coral Growth, Limnology and Oceanography, pp. 716-720, May 1999.
Bing Wu, Catalytic Conversion of NaHCO3 into Formic Acid in Mild Hydrothermal Conditions for CO2 Utilization, Catalysis Today, pp. 405-410, 2009.
Hamilton et al, Calculations of Analytical Chemistry, McGraw-Hill Book Company, Seventh Edition, pp. 190-195, 1969.
Ullmann's Encyclopedia of Industrial Chemistry, Fifth Edition, vol. A5, pp. 173-174, 1986.
CO2CRC Tests New CO2 Capture Technology, Carbon Capture Journal, single sheet, Jun. 21, 2011.
Helfferich, Ion Exchange, McGraw-Hill Book Company, Chap. 1, pp. 8-9, 1962.
Stumm et al., Aquatic Chemistry, John Wiley & Sons, first page of Preface to the Second Edition, pp. 240-243, 1981.
Pundsack et al., The Properties of Asbestos III. Basicity of Chrysotile Suspensions, J. Phys. Chem. vol. 60(9), pp. 1218-1222, 1956.
Millot, Geology of Clays, Springer-Verlag, pp. 62-63, 88-89, 1970.
Diamond et al., Transformation of Clay Minerals by Calcium Hydroxide Attack, Proceedings, 12th National Conference on Clays and Clay Minerals, Pergamon Press, pp. 359-379, 1964.
Suquet, Effects of Dry Grinding and Leaching on the Crystal Structure of Chrysotile, Clays and Minerals, vol. 37, No. 5, pp. 439-445, 1989.

* cited by examiner

*Primary Examiner* — Steven Bos
(74) *Attorney, Agent, or Firm* — Donald S. Dowden

(57) ABSTRACT

A material with cationic exchanger properties is introduced into aqueous media, where the equilibriums of carbon dioxide dissolution take place. A cationic exchanger material $x/nM^{+n} E_x^-$ is used to capture hydronium cations ($H_3O^+$) according to:

$$x/nM^{+n}E_x^-(s) + xH_3O^+(aq) = xH_3O^+E_x^-(s) + x/nM^{+n}(aq)$$

where "x" stands for molar amount of the anionic centers of charge of the cationic exchanger material $E_x^-$ balanced by x/n molar amount of metal M, "n" stands for the metal valence, and M is selected from the group consisting of 1A and/or 2A of the periodic table of elements. This capture of the hydronium cations, $H_3O^+$, shifts certain reaction equilibriums to the right, according to Le Chatelier's principle, producing more bicarbonate, $HCO_3^-$, and/or carbonate, $CO_3^=$, than would otherwise be obtained.

19 Claims, 11 Drawing Sheets

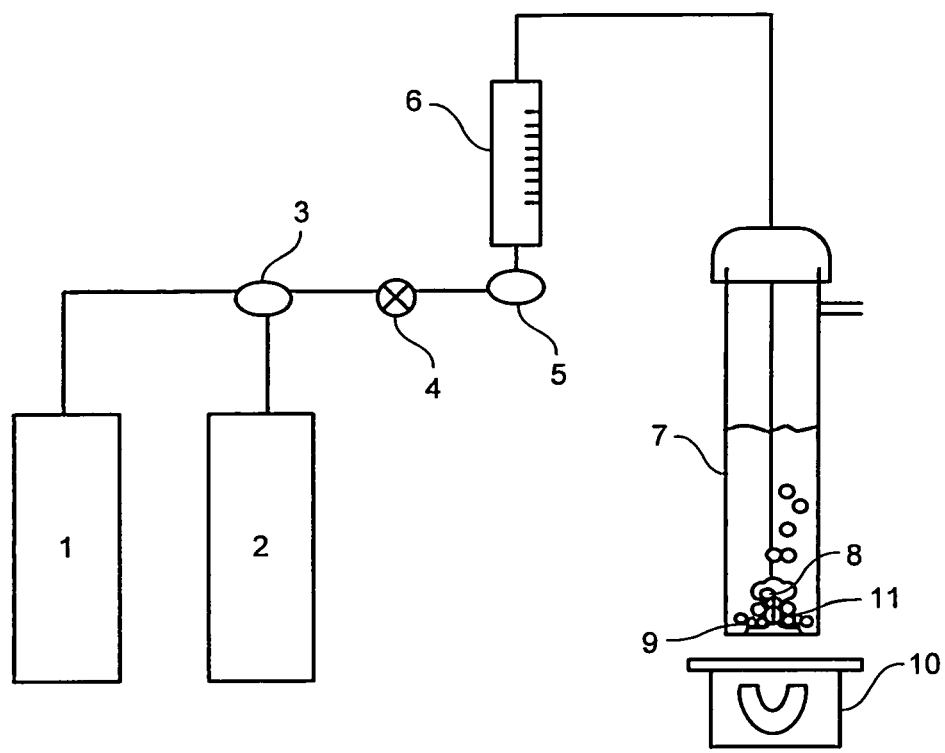
F I G. 1

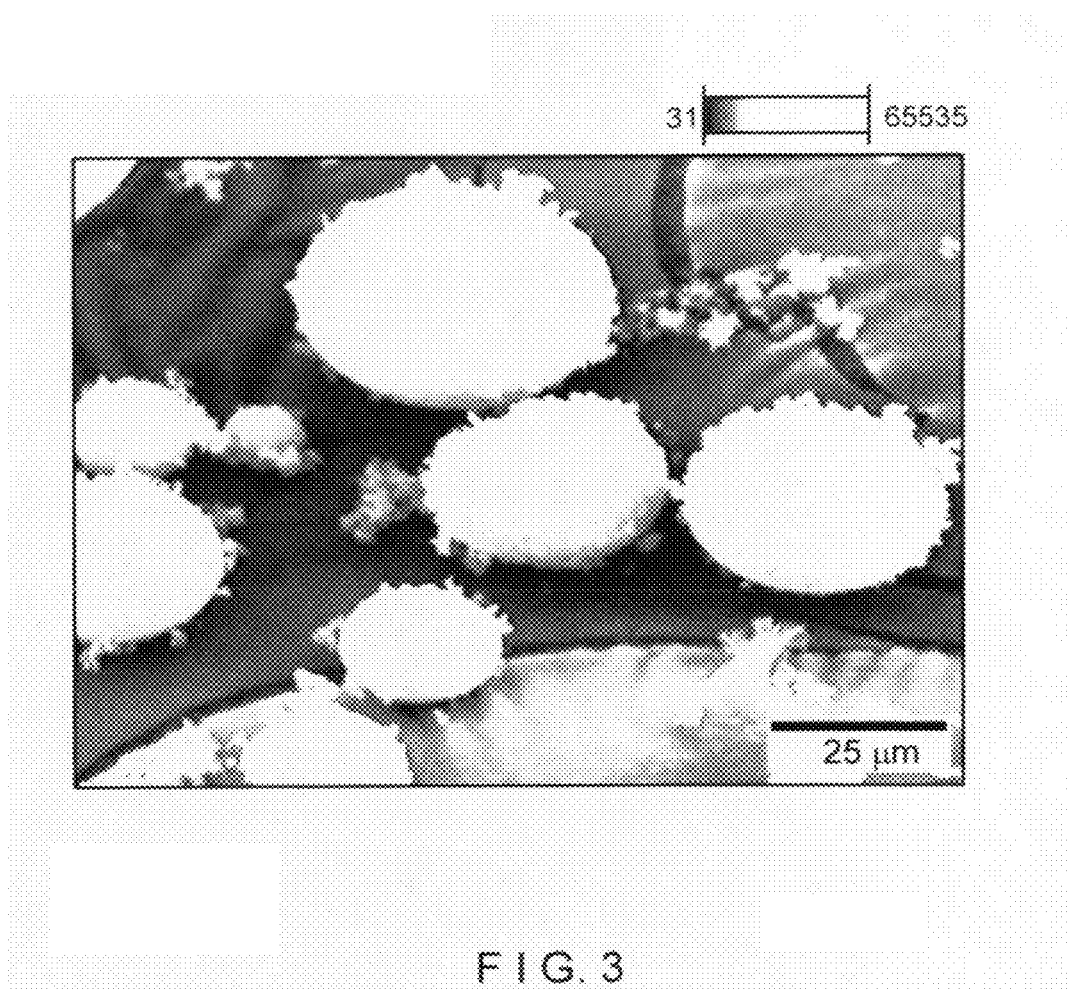
F I G. 3

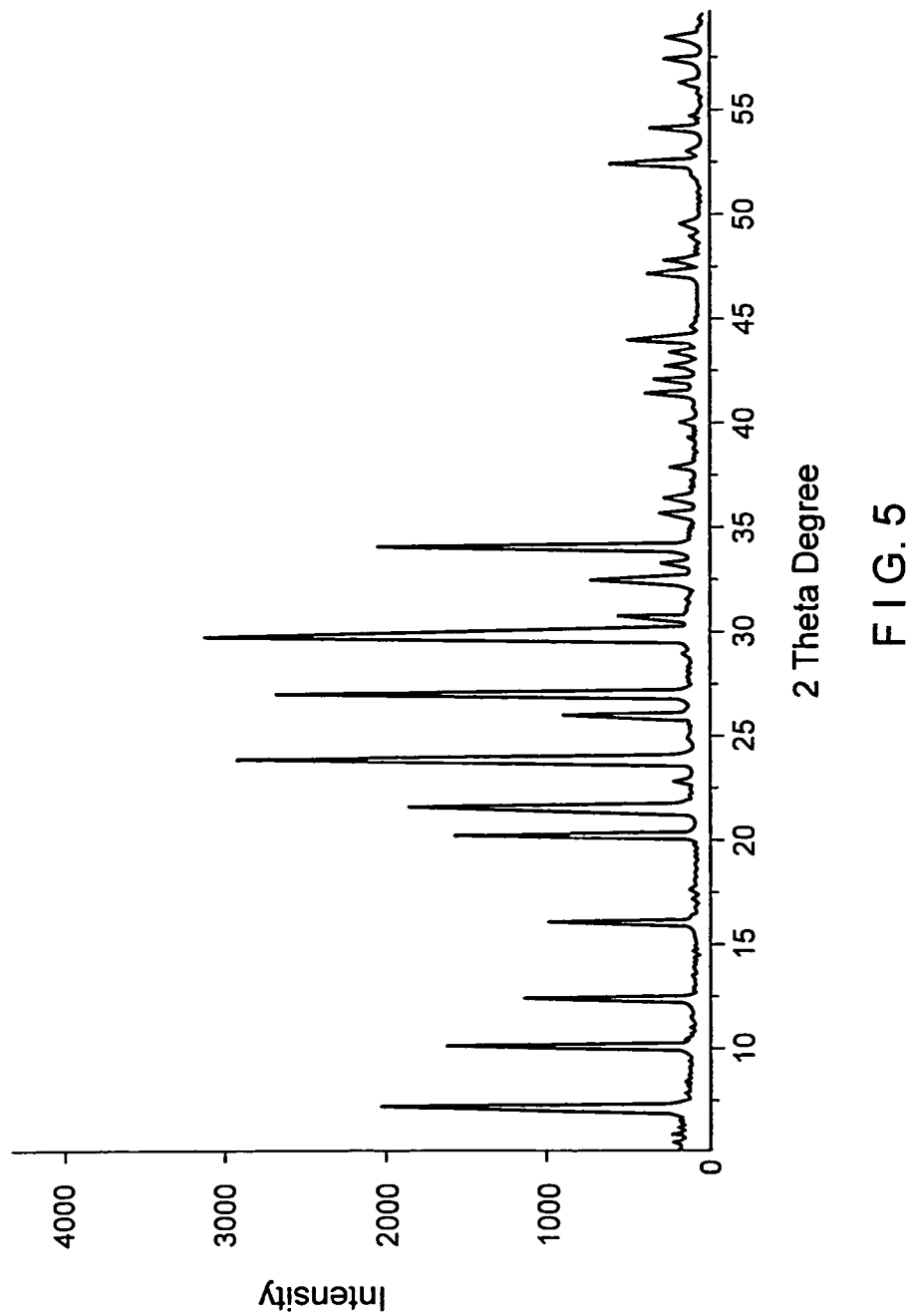
F I G. 5

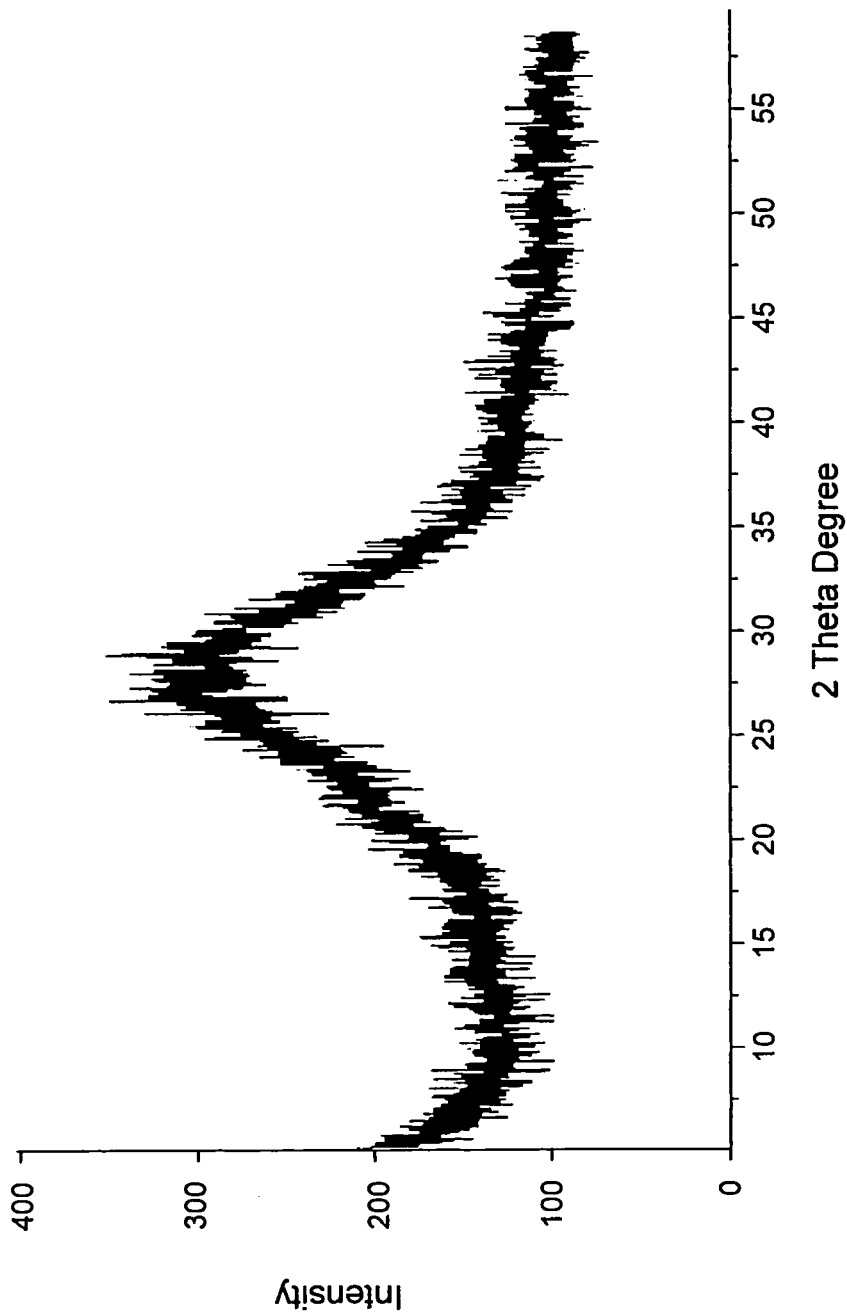
F I G. 7

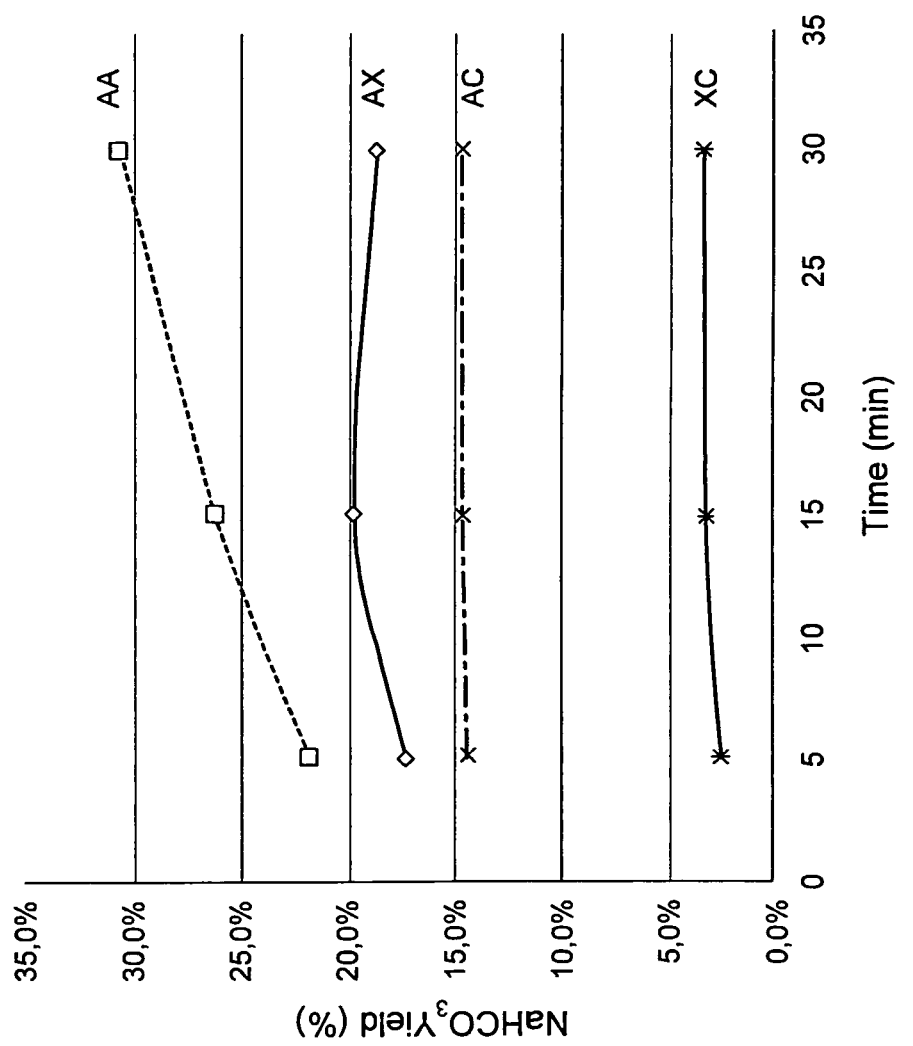
F I G. 9

CONVERSION OF GASEOUS CARBON DIOXIDE INTO AQUEOUS ALKALINE AND/OR ALKALINE EARTH BICARBONATE SOLUTIONS

BACKGROUND OF THE INVENTION

1. Field of the Invention

The present invention relates to the conversion of gaseous carbon dioxide into an aqueous solution of alkaline and/or alkaline earth bicarbonate solutions useful for the production of solid alkaline bicarbonates, alkaline carbonates, and/or alkaline earth carbonates. In a preferred embodiment, the invention entails converting a feed stream of gaseous greenhouse carbon dioxide into an alkaline and/or alkaline earth bicarbonate solution using solid regenerable inorganic cationic exchanger materials, specifically either crystalline or amorphous silicoaluminates.

2. Description of the Prior Art

Most of the solid alkaline bicarbonates and carbonates are obtained from their aqueous solutions, by any evaporation or crystallization process. These bicarbonates and carbonates have numerous applications in daily life. To be mentioned, two of the most used are sodium carbonate and sodium bicarbonate.

Sodium bicarbonate ($NaHCO_3$) is one of the most widely used chemical commodities in the world. It is used in cooking as a leavening agent; in medicine as an antacid to treat chronic forms of metabolic acidosis and in cardiopulmonary resuscitation; in skin defoliants, toothpastes, cleaning agents, chemical fire extinguishers, and fungicides; for the biological control of wastewater; and as a dyeing agent in the textile industry.

Another alkali material, synthetically derived from aqueous solutions of sodium bicarbonate, is sodium carbonate ($Na_2CO_3$) or soda ash, which is used in large amounts in making glass, sodium silicates, soaps and detergents, and for flue gas desulfurization, among other things. Lithium carbonate and potassium carbonate are used in molten carbonate fuel cells. Alkaline earth metal carbonates are widely used in the synthesis of ceramics, as catalytic support for the preparation of carbon nanotubes, in the paper industry, and for cleaning solid surfaces by dry blasting. All of these alkaline bicarbonates and alkaline or alkaline earth carbonates are prepared using their aqueous solution as raw material. In particular, all of these sodium bicarbonate and sodium carbonate chemicals are prepared using an aqueous solution of alkaline or alkaline earth bicarbonate as raw material.

The main naturally occurring source of sodium bicarbonate is nahcolite ($NaHCO_3$), but it occurs frequently in association with trona mineral—trisodium hydrogendicarbonate dihydrate or sodium sesquicarbonate ($Na_2CO_3 \cdot NaHCO_3 \cdot 2H_2O$). One way to get a sodium bicarbonate solution is through a carbonation of a dissolution of trona mineral, after several processes for removing the impurities present in trona. However, high-quality reserves of sodium bicarbonate are unevenly distributed around the world and are a mineral resource that is being largely depleted. They are found mainly in Utah, California, Colorado and Wyoming, which makes this resource difficult to obtain in many developed and developing countries. Similarly, potassium bicarbonate solutions are obtained by bubbling carbon dioxide in a solution of potassium carbonate, as described in Ullmann's Encyclopedia of Industrial chemistry, Vol A5, fifth edition. Wolfgang Gerhartz (exe Ed), pp 173-174. New York, 1986.

A sodium bicarbonate solution can be obtained through the Solvay process using carbon dioxide. Also called the ammonia-soda process, this is a major conventional process for producing a synthetic sodium bicarbonate solution, which is the source for making refined sodium carbonate, $Na_2CO_3$ (soda ash), refined sodium bicarbonate, $NaHCO_3$, and occasionally refined sodium sesquicarbonate, $Na_2CO_3 \cdot NaHCO_3 \cdot 2H_2O$. In the Solvay process, carbon dioxide ($CO_2$) is dissolved in water containing ammonia ($NH_3$) and sodium chloride ($NaCl$) to precipitate sodium bicarbonate ($NaHCO_3$), which is then separated by filtration.

Conventionally, this is carried out in two main steps: Ammonia gas is first introduced into sodium chloride brine, and only then, in another apparatus, is carbon dioxide gas introduced to make a sodium bicarbonate saturated solution, from which bicarbonate precipitates. Although the chemical reactions involved may seem simple, they are complex in reality. Considerable heat is evolved during the ammoniation of brine, and intense cooling is required for the necessary degree of ammonia saturation. Carbonation of ammoniated brine is also accompanied by the evolution of considerable heat, so that the apparatus must be cooled in order to improve yield, and the cooling must be controlled to form good crystals. Thus, the process is complex and intensive in energy use.

Because of the ammonia, the obtained sodium bicarbonate solution is contaminated with ammonium compounds such as ammonium carbonate (($NH_4)_2CO_3$), ammonium bicarbonate ($NH_4HCO_3$) and ammonium carbamate ($NH_4COONH_2$). Most of these impurities end up in the final solid sodium bicarbonate and render it unfit for many uses, and additional refining steps are required for adjusting purity, regardless of the purity of the sodium chloride and carbon dioxide used.

Moreover, the Solvay process is not ecologically friendly; the management and safe disposal of chloride-containing waste streams is one of its major problems. And its cost is so high that many people in developing economies cannot afford sodium bicarbonate produced by this process.

In nature's carbon cycle, falling rainwater, with its high surface area, picks up carbon dioxide as it descends through the atmosphere. When fallen rainwater moves down through the topsoil, it may acquire additional quantities of carbon dioxide produced by the biological decomposition of organic matter. All of that carbon dioxide dissolved in water produces a weak carbonic acid, which can react with calcium carbonate deposits to produce calcium bicarbonate, which is more soluble in water than calcium carbonate. This mechanism increases the calcium content in groundwater. The same can be said for magnesium carbonate deposits, which are also soluble in water.

This natural process establishes typical bicarbonate content in rivers within the range of 30 mg/L to 400 mg/L (Water Quality and Its Control, James C. Lamb III. Chap 7, pp 131-135, John Wiley & Sons Inc. 1985). For the removal of calcium and magnesium bicarbonates to soften water, a practice of longstanding employs materials with cationic exchange properties. Such materials are in general called "zeolites," which in old field parlance refers to a set of materials with different compositions and structures, including bentonitic clay, synthetic gel-type minerals, lignite, soft coal, bitumens, and synthetic resins ("The Chemical Process Industries" R. Norm Shrive, Chap. 4, pp 47-50, 2° Ed. McGraw-Hill Book Company. 1956). The following reaction represents the use of zeolite to soften water containing calcium bicarbonate:

$$Ca(HCO_3)_2 + Na_2Z \rightarrow CaZ + 2NaHCO_3$$

A similar reaction may be written for other bicarbonates found in water, such as those of magnesium, calcium, etc.

However, a process in accordance with the above reaction is not efficient for producing large quantities of sodium bicarbonate from river water. Considering the low concentrations of bicarbonate mentioned above, it would require an enormous amount of time to get a solution with an appreciable concentration of sodium bicarbonate. The sodium bicarbonate would moreover be highly contaminated with bicarbonates of other cations, such as magnesium. Also, it must be realized that it is at least a two-step procedure, where the first step is carried out by nature—carbon dioxide captured by rain—and the second is a man made exchange using a sodium zeolite.

In U.S. Pat. No. 2,392,575 dated 1946, Tiger et. al. disclose a metathetical two-step conversion of common salt to sodium bicarbonate ($NaHCO_3$) through the net reaction:

$$NaCl + H_2CO_3 = HCl + NaHCO_3$$

This reaction is performed using an insoluble hydrogen "carbonaceous zeolite" (acid-treated sulfate lignite or soft coal) stripped of metallic cations. First, a sodium chloride solution is passed through a bed of such hydrogen carbonaceous zeolite. An excess of sodium chloride and hydrochloric acid is produced, leaving a sodium carbonaceous zeolite. Second, the sodium is contacted with a pressurized solution of carbonic acid obtained as a product of combustion. The hydrogen carbonaceous zeolite is regenerated, and a dilute solution of sodium bicarbonate is produced.

The hydrogen carbonaceous zeolite, the sodium chloride solution, and the solution of carbonic acid cannot be put all together in one simple step, because the sodium chloride exchange produces hydrochloric acid (HCl), which, together with the hydrogen carbonaceous zeolite, which is also acidic, would quickly decompose the sodium carbonate of the solution of pressurized carbonic acid into carbon dioxide gas (Chemical Characteristics and Structure of Cracking Catalysts, A. G. Oblad, T. H. Milliken, Jr., and G. A. Mills in Advances in Catalysis vol. 3, p 204, Academics Process, 1965). The high acidity level (a pH less than 4) hinders the formation of bicarbonate regardless of the length of time of the contact with the pressurized solution of carbonic acid.

There are several disadvantages with these relatively inexpensive hydrogen carbonaceous zeolites: low cationic exchange capacity (less than 1 meq/g), poor mechanical resistance (not suitable for pressurizing, bubbling, or a fluidized bed), and poor chemical stability to alkalis (sodium bicarbonate or sodium carbonate solutions), so that carbon particles go into the bicarbonate or carbonate solution and then peptize (F. Helfferich. Ion Exchange. Chap 2, pp 17-18. Dover Publications Inc. 1995; M Kodama, N. Shimisu, et al. Carbon 28 (1): 199-205 (1990)). Other types of carbonaceous materials, including cationic exchange resins, have better properties, but their initial cost, currently around $10,000/m³, and regeneration cost both adversely affect the economics.

Amorphous silica aluminas and crystalline zeolites became available around the middle of the twentieth century. Their sodium forms are cheap, have high cationic exchange capacity, and can be used to perform the procedure disclosed in U.S. Pat. No. 2,392,575. To obtain the hydrogen form of such aluminosilicates, first the sodium form must be converted into the ammoniacal form through ion exchange with an ammonium salt solution and dried. Then, a calcination step at a temperature within the range of 400° C. to 500° C. produces the hydrogen form of the aluminosilicate, very often with severe loss of cationic exchange capacity. Only after performing these preparatory steps can the procedure of U.S. Pat. No. 2,392,575 be performed.

In this procedure, a sodium chloride solution is passed through a permeable bed of the hydrogen form of these aluminosilicates. This produces hydrochloric acid, which causes a destructive acid attack on the aluminosilicates and a decomposition of the sodium bicarbonate as mentioned above. So in this procedure, the hydrogen form of these aluminosilicates does not improve the production of a sodium bicarbonate solution.

The prior art processes for obtaining sodium bicarbonate solutions clearly leave much to be desired.

OBJECTS AND SUMMARY OF THE INVENTION

An object of the invention is to obtain solutions of alkaline and/or alkaline earth bicarbonates that are free of impurities, from which chemicals of high quality can be obtained, including any of the following:

sodium bicarbonate crystals
other alkaline bicarbonates
sodium carbonate
other alkaline carbonates
alkaline earth carbonates Other objects of the invention include the provision of a simple, economical and safe procedure for:

capturing high levels of greenhouse carbon dioxide from the atmosphere anywhere on earth and converting it into solutions of bicarbonates, thereby ameliorating the effect of human activity on global climate;

providing a new source of chemicals for coral reef remediation, abatement of water acidity, and treatment of hazardous materials;

separating carbon dioxide from a mixture of gases; and producing solid alkaline bicarbonate, alkaline carbonate and/or alkaline earth carbonates for the industrial market.

Another object of the invention is to provide a process for attaining the above objects that takes advantage of the relatively low cost of sodium chloride and the worldwide surplus of gaseous carbon dioxide.

In addition, an object of the invention is to provide apparatus for carrying out the process of the invention.

The foregoing and other objects of the invention are attained in a preferred embodiment of the invention by a process comprising introducing a material $[(M_{x/n}^{+n})W_x^-]$ with cationic exchange properties into aqueous media, where the equilibriums of carbon dioxide dissolution take place and hydronium cations are produced. The cationic exchange material $[(M_{x/n}^{+n})E_x^-]$ captures hydronium cations ($H_3O^+$) according to:

$$[(M_{x/n}^{+n})E_x^-](s) + xH_3O^+(aq) = [(H_3O^+)_xE_x^-](s) + x/nM^{+n}(aq)$$

where "x" stands for the molar amount of the anionic centers of charge of the cationic exchanger material $[(M_{x/n}^{+n})E_x^-]$ balanced by x/n molar amount of metal M, "n" stands for the metal valence, and "M" is selected from the group consisting of the elements in 1A and/or 2A of the periodic table of elements.

As explained below, this increases the yield of the desired chemicals in accordance with Le Chatlier's principle.

BRIEF DESCRIPTION OF THE DRAWING

A better understanding of the objects, features and advantages of the invention can be gained from a consideration of the following detailed description of its preferred embodiments, in conjunction with the appended drawing, wherein:

FIG. 1 is a schematic view of apparatus for carrying out a process according to the invention;

FIG. 3 is a an image produced by a scanning electron microscope of microspheres of XC cationic exchange material, ranging in size between roughly 5 μm and 100 μm;

FIG. 5 shows the X-ray diffraction pattern of an AC cationic exchange material;

FIG. 7 shows the X-ray diffraction pattern of an LTA cationic exchange material;

FIG. 9 shows the sodium bicarbonate yields for AA, AX, AC and XC cationic exchange materials as a function of time;

DETAILED DESCRIPTION OF THE INVENTION

Figure 2:
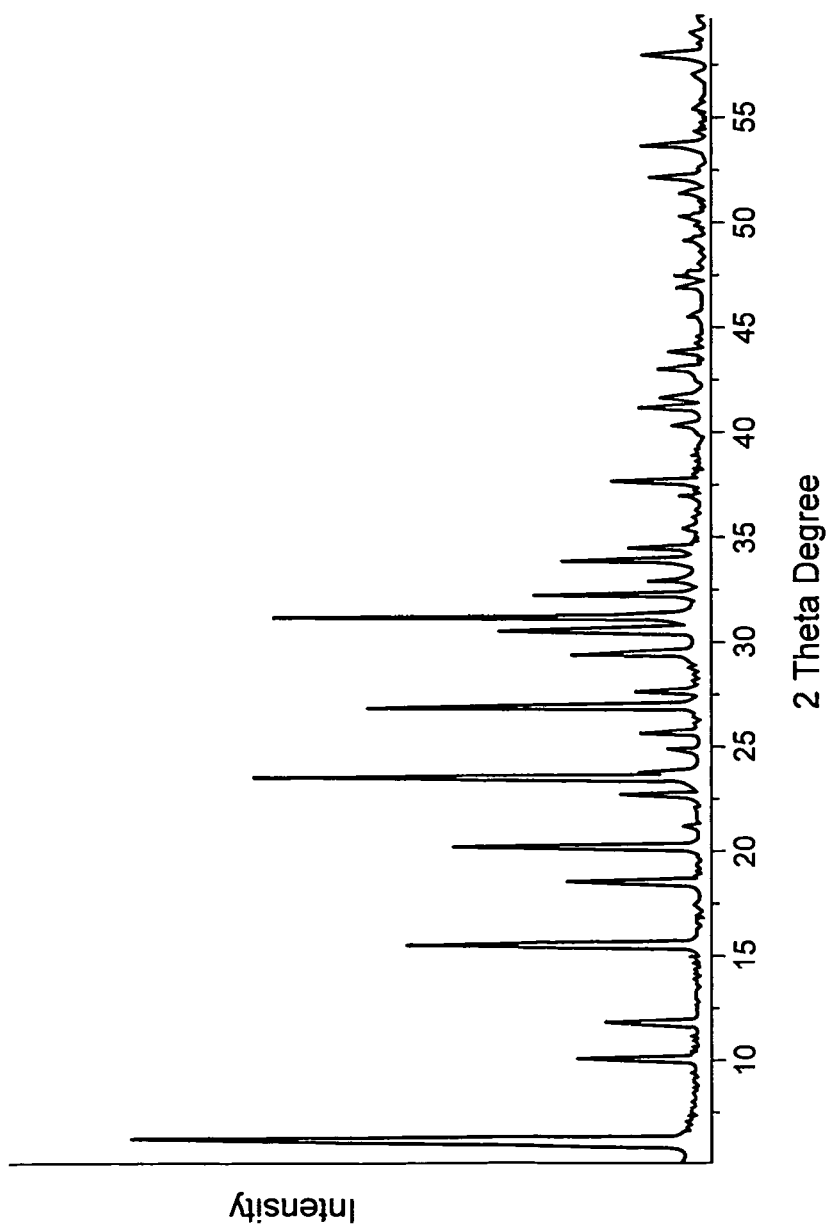
FIG. 2 is an X-ray diffraction pattern of a faujasite type X zeolite cationic exchange material.

The present invention makes use of the carbonate chemistry that occurs when carbon dioxide ($CO_2$) dissolves in water through a set of reactions yielding hydronium cations ($H_3O^+$) and bicarbonate anions ($HCO_3^-$) in aqueous media. If hydronium cations ($H_3O^+$) are replaced by alkaline cations or alkaline earth cations, an alkaline or alkaline earth bicarbonate is formed. This invention takes advantage of the property of some materials to exchange their nonframework alkaline cations for hydronium cations ($H_3O^+$) in aqueous media, therefore making possible the replacement mentioned above. These alkaline and/or earth alkaline bicarbonates, e.g. sodium bicarbonate ($NaHCO_3$) in aqueous solution can be recovered from the aqueous media through evaporation, crystallization, solid-liquid separation and drying in order to get solid alkaline bicarbonate or alkaline earth bicarbonate or mixtures of carbonates and bicarbonates suitable to be transformed into the most valuable high bulk density alkaline carbonate.

In aqueous (aq) media, there is a shift of the equilibriums among carbon dioxide ($CO_2$), carbonic acid ($H_2CO_3$), bicarbonate ($HCO_3^-$) and carbonate ($CO_3^=$), which takes place when gaseous (g) carbon dioxide dissolves in liquid (l) water according to following reactions:

$$CO_2(g)+H_2O(l)=H_2CO_3(aq) \quad (1)$$

$$H_2CO_3(aq)+H_2O(l)=HCO_3^-(aq)+H_3O^+(aq) \quad (2)$$

$$HCO_3^-(aq)+H_2O(l)=CO_3^=(aq)+H_3O^+(aq) \quad (3)$$

It is noticed that dissociation of carbonic acid ($H_2CO_3$) in reaction (2) and dissociation of bicarbonate anion ($HCO_3^-$) in reaction (3) both yield the hydronium cation ($H_3O^+$), which can be exchanged in the aqueous media.

The invention involves introducing a material $[(M_{x/n}^{+n}E_x^-)]$ with cationic exchange properties into the aqueous media, where the equilibriums of carbon dioxide dissolution take place, and the hydronium cations ($H_3O^+$) are captured by the solid (s) cationic exchange material $[(M_{x/n}^{+n}E_x^-)]$ disclosed herein, according to:

$$[(M_{x/n}^{+n})E_x^-](s)+xH_3O^+(aq)=[(H_3O^+)_xE_x^-](s)+x/nM^{+n}(aq) \quad (4)$$

where "X" stands for molar amount of the anionic centers of charge of the cationic exchange material $[(M_{x/n}^{+n}E_x^-)]$ balanced by x/n molar amount of metal M, "n" stands for the metal valence, and "M" is selected from the elements in group 1A and/or 2A of the periodic table of elements.

This capture of the hydronium cations, $H_3O^+$, shifts the equilibriums set out in reactions (2) and (3) to the right, according to Le Chatelier's principle, producing more bicarbonate, $HCO_3^-$, and/or carbonate, $CO_3^=$, both of which can be combined with metal aqueous species, $M^{+n}$, in order to produce useful bicarbonates according to:

$$M^{+n}(aq)+nHCO_3^-(aq)=M(HCO_3)_n(aq) \quad (5)$$

Thereafter, an aqueous solution of metallic bicarbonate is separated from the cationic exchange material by any of the liquid/solid separation methods of the art. This aqueous solution can undergo any crystallization process known or to be discovered in the art to produce a precipitate of bicarbonate and/or carbonate, which is then washed and dried.

The cationic exchanger material can be regenerated by ion exchange with an unsaturated solution of ionic salt of metal $M^{+n}$, replacing hydronium cations, $H_3O^+$, in the used cationic exchanger material, $[(H_3O^+)_xE_x^-]$, by fresh $M^{+n}$ cations, making the used cationic exchanger material, $[(H_3O^+)_xE_x^-]$, suitable for recycling, according to:

$$[(H_3O^+)_xE_x^-](s)+x/n(M^{+n})(aq)+x/m(A^{-m})(aq)= [(M_{x/n}^{+n})E_x^-](s)+xH_3O^+(aq)+x/mA^{-m}(aq) \quad (7)$$

where $A^{-m}$ stands for the anion of valence "m" selected from the group consisting of chlorides, sulfates, nitrates, α-hydroxy carboxylates, o-hydroxybenzoates, carboxylates, amine corrosion inhibitors, polyphosphate, and hexametaphosphates.

It is also desirable in this invention to provide, besides the cationic exchange material, $x/nM^{+n}$, other kinds of solid materials that can improve the transfer of carbon dioxide from gas phase to aqueous phase. The solid material can be silicas, aluminas, titanias, zirconias, iron oxides, oxo-hydroxides of them, carbons and biological catalyts as carbonic anhydrase as well their mixtures, whether crystalline and/or amorphous, provided that those solids have a specific surface area of at least 0.1 m²/g.

More particularly, our invention is concerned with the use of alkaline or/and alkaline earth aluminosilicate materials with cationic exchange properties such as crystalline zeolites and amorphous silica aluminas. Preferred crystalline aluminosilicates are zeolites of silicon-to-aluminum molar ratio lower than 100 as a cationic exchange material, especially with sodium LTA (Linde Type A) zeolite and sodium zeolites of the group of faujasites (zeolites X and Y), zeolite P, clinoptilolites, mordenites, ZSM-5, mutinaite and mixtures thereof.

For example, our invention is concerned with the use of alkaline forms of crystalline and/or amorphous aluminosilicate materials in which atoms other than aluminum and silicon are substituted for some aluminum (e.g iron) and silicon (e.g germanium) atoms in tetrahedral coordination.

If work is done with a sodium zeolite material ($Na^+Z^-$), the hydronium cations, $H_3O^+$, coming from carbonic acid and bicarbonate dissociations, as in reactions (2) and (3), are taken up by the sodium zeolite, and the sodium extra framework cation of the zeolite is replaced by the hydronium cation, shifting the equilibrium as follows:

$$Na^+Z^-(s) + H_3O^+(aq) = H_3O^+Z^-(s) + Na^+(aq) \quad (8)$$

The sodium cations now in the aqueous media can combine with the bicarbonates, $HCO_3^-$, and carbonates, $CO_3^=$, also present in this aqueous media, according to:

$$Na^+(aq) + HCO_3^-(aq) = NaHCO_3(aq) \quad (9)$$

$$2Na^+(aq) + CO_3^=(aq) = Na_2CO_3(aq) \quad (10)$$

Sodium bicarbonate, $NaHCO_3$, and/or sodium carbonate, $Na_2CO_3$, are then precipitated using any process known or to be discovered in the art.

The present invention thus provides a method for producing sodium bicarbonate aqueous solutions that can be processed to yield solid sodium bicarbonate, sodium carbonates and their mixtures. This is accomplished by contacting an aqueous suspension of a cationic exchange material with a stream of carbon dioxide in an amount and for a time sufficient to cause carbon dioxide to dissolve in the aqueous suspension to produce hydronium cations ($H_3O^+$) and bicarbonate anions ($HCO_3^-$). The cationic exchanger material takes up hydronium cations ($H_3O^+$) from the aqueous media and releases the sodium cations to the aqueous suspension. Then liquid can be separated from the solid exchanger material and conveyed to an evaporator or crystallizer or any other device where solid sodium bicarbonate ($NaHCO_3$), or sodium carbonate or their mixtures are obtained.

Used cationic exchanger material is regenerated by contacting this material with a sodium chloride solution for a time adequate, at temperature below 100° C., to cause sodium replacement in the cationic exchanger material. Finally, the cationic exchanger material is washed and reused.

The importance of carbon dioxide pressure to the bicarbonate concentration in the liquid phase is recognized. Carbon dioxide ($CO_2$) dissolution is mass-transfer-limited, and therefore reaction (1) appears slow.

$$CO_2(g) + H_2O(l) = H_2CO_3(aq) \quad (1)$$

Most of the $CO_2$ exists in solution as dissolved $CO_2$ and not as $H_2CO_3$ as shown in reaction (1), but this does not affect the chemistry, and reaction (1) is conceptually simple.

The concentration of $H_2CO_3$ in solution is related to the partial pressure of $CO_2$ above the solution ($P_{CO2}$) by reaction (11) where $K_H$ is the Henry's Law Constant.

$$[H_2CO_3] = K_H P_{CO2} \quad (11)$$

Carbonic acid ionizes in water via reaction (2). This reaction is essentially instantaneous.

$$H_2CO_3(aq) + H_2O(l) = HCO_3^-(aq) + H_3O^+(aq) \quad (2)$$

The concentrations of the various species are related by reaction (12). $K_{a1}$ is the first acidity constant of carbonic acid.

$$[HCO_3^-][H_3O^+] = K_{s1}[H_2CO_3] \quad (12)$$

The expression for $[H_2CO_3]$ found in reaction (12) can be substituted in reaction (1), and the result rearranged to yield reaction (13). Reaction (13) demonstrates that the bicarbonate concentration depends on pH and $CO_2$ partial pressure $$[HCO_3^-] = \frac{K_{a1} K_H P_{CO2}}{[H_3O^+]} \quad (13)$$

There are many compositions of matter with cationic exchange properties, e.g. amorphous and crystalline forms of tetravalent metal acid salts, generally called single salts, with the general formula: $M(IV)(HXO_4)_2 \cdot NH_2O$, where M represents Zr(IV), Ti(IV), Sn(IV), etc; and X represents P, W, Si, Mo, Se, As, etc. Still other natural silicoaluminate materials can be used, such as: cationic silica gels; feldspars; clays of the group of kaolinite, halloysites, smectites (bentonites, montmorillonites), illites, vermiculites, chlorites, sepiolites, attapulgites, palygorskites and their mixtures. Preferably, however, the invention is carried out with synthetics alkaline or alkaline earth silicoaluminate compositions with high cationic exchange capacity because they are readily and inexpensively available in the current market, and the scale-up processes are well known.

This invention can be carried out with exchangers whose exchangeable cations are elements of group 2A of the periodic table. However, exchanging univalent cations in solution, such as $[H_3O^+]$, with polyvalent cations, as in the case of any of elements in group 2A of the periodic table, requires a high initial concentration of $[H_3O^+]$ cations in the aqueous phase and takes a relatively long time, because of the affinity of cationic exchanger material for polyvalent cations.

Another problem is that the alkaline earth bicarbonates may produce practically insoluble carbonates and precipitate over the cation exchanger material during the process of carbon dioxide conversion, bringing fouling problems. Other types of exchangeable cations are those of the first transition metal series, whose bicarbonates, e.g. nickel bicarbonate, can be obtained using this invention. However, most of these cations pose disposal problems.

Some of the many advantages of the invention are described below.

The excess carbon dioxide in the atmosphere is a problem that the present invention can address. The consensus among atmospheric scientists is that the activities of humans are affecting the climate of the planet, primarily by the production of greenhouse gases. While some argue that Earth is overdue for a new Ice Age, it is generally acknowledged that, even if that is so on a geological timescale, the immediate threat, say for the rest of the 21st century or even for several centuries, is not cooling but global warming, rising sea levels, and resultant changing weather patterns. Global warming causes species of flora and fauna that have adapted over long periods to a particular ecological niche to retreat to higher elevations and latitudes. But there is no retreat above the tops of mountain ranges or beyond Earth's poles. Global warming by itself, without considering secondary effects such as rising sea levels and changing weather patterns, will likely cause the extinction of many species.

The main greenhouse gas in terms of effect on climate is carbon dioxide; water vapor is the second most important. Rising global temperatures due to excess atmospheric carbon dioxide increase water vapor in the atmosphere, causing a positive feedback loop.

Carbon dioxide is produced by the burning of fossil fuels and other combustible materials and by the decomposition of carbonates in the cement, glass, silica and silicate industries. Sensors atop Mauna Loa in Hawaii reveal, as reported by the New York Times on Dec. 22, 2010, that not only is the carbon dioxide level rising relentlessly, but also the pace of that rise is accelerating. By the end of the century, atmospheric carbon dioxide levels may be double those before the Industrial Revolution.

Greenhouse gases, including particularly carbon dioxide, pose a threat that must be addressed. The steps that are being taken fall short of what is needed. Various measures, including cap-and-trade, stricter CAFE standards, international treaties and voluntary conservation, have met varying degrees of acceptance and resistance by governments and private citizens.

These considerations demonstrate the need for a low-cost procedure that can be coupled with carbon-dioxide-emitting industries to capture carbon dioxide and convert it into compounds that pose little or no harm to the environment. In accordance with the present invention, it is possible to take carbon dioxide emissions, to fix the carbon dioxide using an aqueous solution of bicarbonate, and to deliver this solution to a coral reef, where it can be fixed as carbonate into a calcareous skeleton. There is evidence that sodium bicarbonate solutions are useful for promoting coral growth (e.g., Francesca Marubini and Brenda Thake, Limnology and Oceanography, vol. 44, No 3. Part 1, pp 716-720, May 1999), which also might be useful for coral reef water acidity remediation.

To decrease carbon dioxide emissions from burning fossil combustibles, another possibility is to send bicarbonate solutions to a bioreactor as a nutrient for algae or fungi making sulfur- and nitrogen-free biocombustibles or biogas. Still another possibility is conversion of this solution of bicarbonate into some other chemical compound. In this connection, there is incipient research about the catalytic conversion of sodium bicarbonate into formic acid (Bing Wu et al. Catalysis Today. 148: 405-410 (2009)), which is an important basic chemical for biodegradable disinfectants, where the lowest environmental impact is sought and no residues are allowed. It is also used as a preservative and antibacterial agent, in natural rubber manufacturing, as a chemical building block in the chemical and pharmaceutical industries, and as a nonflammable solvent for hydrogen storage. Also, sodium bicarbonate solution is a raw material for other important chemical commodities including ethyl chlorocarbonate, diethyl carbonate, and urea.

In the cationic exchanger regeneration, the anion of the regenerant salt ends as an acid. If the salt is sodium chloride or sodium sulfate ($Na_2SO_4$), the acid is hydrochloric acid or sulfuric acid, respectively. If common salt (NaCl) and water of good quality are used in the regeneration of the cationic exchanger material, and provided that this NaCl be separated from the acid solution if it is the case, a valuable, good-quality hydrochloric acid can be obtained. This acid is an important chemical in numerous applications, for example producing chlorides and acidizing petroleum wells. Hydrochloric acid can be captured by iron-rich clays to produce water treatment chemicals such as iron (III) chloride and polyaluminum chloride. The former is used in the electronics industry, in ore reduction and refining for the production of tin and tantalum, as a pickling and metal-cleaning agent, for pH adjustment, and in general cleaning. It is also used for electroplating, removing scale from boilers, neutralizing basic systems, deionizing water for the food and pharmaceutical industries, making more space in depleted gas and oil reservoirs, for carbon dioxide sequestration, manufacturing fertilizers and dyes, and hydrolyzing starch and proteins in the preparation of various food products; as a laboratory reagent, catalyst and solvent in various organic syntheses; and in the photographic and textile industries.

In accordance with the invention, a simple procedure for sequestering carbon dioxide in a bicarbonate solution can be coupled with a carbon dioxide emitting facility to mitigate carbon dioxide emission into the atmosphere and recycle the raw materials used. One example is the precipitation of silica from sodium silicate. In this process, sodium carbonate ($Na_2CO_3$) is used, and significant amounts of carbon dioxide are generated. In accordance with the invention, this carbon dioxide can be fixed as a bicarbonate solution and later transformed into solid sodium carbonate. The sodium sulfate or sodium chloride present in the liquid filtrate because of the precipitation of silica comes into contact with the used hydrogen form of the cationic exchanger material and thereby regenerates the cationic exchanger material and restores either hydrochloric acid or sulfuric acid to the process. In this way, a decrease a carbon dioxide emissions may be achieved through recycling the acids and the sodium carbonate.

In accordance with the invention, the acid solution coming from the regeneration step of the used cation exchanger material can put in contact with a basic solution whose metal belongs to group 1A or 2A of the periodic table and is preferably the same metal as the exchanging metal of the cationic exchanger material. This neutralization reaction produces the salt used as regenerant plus water, which can be separately recovered by any known method of physical separation. Said basic solution can be obtained by dissolving in water a solid metal hydroxide of the groups above mentioned, up to a convenient pH between 7.5 and 12. However, it is known that certain alkaline aluminosilicates (aluminum-rich zeolites, feldspars) or hydrothermally treated slurries of alkaline silica gel have the property of hydrolyzing water, producing in consequence an alkaline basic solution having a pH between 8 and 11. This basic solution can be separated from the aluminosilicate or alkaline silica-gel materials and put in contact with the acid solution coming from the regeneration step of the used cationic exchanger material. The basic solution will then neutralize the acid solution and yield a solution of the regenerant salt that can be cycled with appropriate adjustment of the concentration. As can be seen, a raw material for this invention can be something as abundant in nature as the carbon dioxide in the atmosphere and as cheap as common salt.

The following examples will further convey an understanding of the invention. The analytical procedures used in all the examples are as follows:

The Cationic Exchange Capacity (CEC), expressed as the ratio of miliequivalents of hydrogen (meq) to the dry basis mass (g) of the sample of synthesized materials as well as commercial materials, is evaluated by titrimetry. A sample size of 0.5 g dry basis is used in all determinations. In a 250 mL conical flask is placed an amount of the sample along with a magnetic bar. Then 50 mL of 0.1 N hydrochloric acid is added. The system is stirred at room temperature for at least one hour. After that, the agitation is stopped, and sedimentation is allowed until a clear solution is obtained. An aliquot of 25 mL of the supernatant solution is taken to another 250 mL conical flask, and 25 mL of demineralized water is added. This solution is titrated with a solution of 0.1 N of sodium hydroxide, using a mixed indicator of methylene blue—neutral red that gives a sharp color change from violet-blue to green at pH 7. Finally, the acid miliequivalents consumed are calculated as the difference between the initial and the final acid miliequivalents. CEC is the ratio of this difference to the dry basis mass.

For the determination of the alkaline bicarbonate or the earth alkaline bicarbonate in the filtrate, the method used is that described in Hamilton, L. F. et al. (Calculations of Analytical Chemistry. pp 190-195. McGraw-Hill Book Company, Seventh Edition, 1969). Previously, the presence of carbonate in solution is tested with a phenolphthalein test. It is positive for carbonate if a pink and negative if colorless. The alkaline bicarbonate or earth alkaline bicarbonate solution is titrated with a 0.1 N of hydrochloric acid solution using a mixed indicator of methyl orange—indigo carmine, which changes from green to magenta with a neutral-grey color at a pH of about 4. Because of the hydrolysis, the initial cation exchanger material slurry is basic, and a small amount of atmospheric carbon dioxide is taken. Therefore, the results reported in the examples are the net yield of bicarbonate.

In all examples, considering the CEC (meq/g), the dry basis mass in grams (Mzd) of cationic exchanger material tested is such that the mass of alkaline bicarbonate or earth alkaline bicarbonate produced in solution is 2.5 g. That is, this value represents 100% of the yield if all the equivalents of the cationic exchanger material are exchanged, according to:

$$Mzd(g)=1/CEC*1000*2.5*1/84.01 \qquad (14)$$

The wet basis mass of the cationic exchanger material in grams (Mzw) is in accordance with the following reaction:

$$Mzw(g)=Mzd/1-(LOI/100) \qquad (15)$$

where LOI is the percent of mass loss of the cationic exchange material taken at an arbitrary temperature of 700° C.

FIG. 1 shows apparatus suitable for carrying out the process of the invention. In a well-cleaned gas-washing flask 7, an amount of cationic exchanger material 11 is charged. In the flask 7 is added previously boiled and room temperature tempered demineralized water, to get an agitated slurry using a magnetic stirrer plate 10 and a magnetic bar 9. The water-to-cationic exchanger material volume ratio is 0.5 to 10, and from 50% to 80% of the total volume of flask 7 is filled. On/off valve 4 is opened, a stream of nitrogen gas from a source 2 is allowed to flow at a rate from 50 ml/min to 500 ml/min, as measured by rotameter 6, and a gas diffuser 8 is introduced into flask 7. The time of nitrogen flowing is from 5 minutes to 60 minutes. Then a change in three-way valve 3 allows a carbon dioxide gas flow from source 1 at a rate from 100 ml/min to 1 L/min; carbon dioxide gas flow time is from 5 minutes to 1 hour.

After this cationic exchanger time, carbon dioxide gas flow is reduced by means of flow control valve 5, and the gas diffuser 8 is removed from the flask 7. The cationic exchanger material slurry is discharged into a Büchner filtering device, where a liquid sodium bicarbonate solution filtrate is obtained. The cationic exchanger material is washed at least once with hot demineralized water at a temperature between 30° C. and 50° C., so that the water-to-cationic exchanger material volume ratio is between 1 and 20. The whole filtrate is conveyed to an evaporation device, where finally a solid alkaline bicarbonate, alkaline carbonate, and/or alkaline earth carbonate and their mixtures are obtained.

Used cationic exchanger material is regenerated by contact with a soluble alkaline and/or earth alkaline salt solution, so that the solution has one to ten times the exchange miliequivalents of the mass of cationic exchanger material used, a temperature from 30° C. to 100° C. for at least 5 minutes, and a liquid-to-solid ratio between 0.5 and 10. Immediately after the cationic exchanger material is separated from the regenerant solution, the solid is washed at least once with hot demineralized water at a temperature between 30° C. and 100° C. The water-to-cationic exchanger material volume ratio is between 1 and 20. Optionally, the solid is dried for at least 1 hour (1 h) at a temperature of at least 80° C. This dried and regenerated cationic exchanger material is used again for a new cationic exchanger with carbonic acid.

In accordance with the invention one may employ as cationic exchanger material $[(M_{x/n}^{+n})E_x^-]$, where its composition of matter is a silicoaluminate or substituted silicoaluminate represented by the general empirical formula $$M^{n+}_{(v+w)/n}[Al_vZ_wSi_yO_{2(v+y+w)}]*mH_2O,$$

where: "M" stands for a non framework exchangeable metal of the group 1A and/or 2A, "n" stands for the valence of the metal, "v" stands for the molar ratio of the anionic centers of tetrahedral aluminum, "v" stands for the molar ratio of the anionic centers of tetrahedral "Z", "Z" stands for all elements of the first transition metals series, Zr, Nb, and elements from groups 5A and 3A of the periodic table, "y" stands for the molar ratio of non anionic centers of tetrahedral silicon, $(v_++w)/n$ is the number of exchangeable cations of valence n, and "m" stands for the number of water molecules adsorbed on external and internal surfaces of the solid cationic exchanger material, so that: $v+w\neq 0$; $v+w\leq y$ and $y/(v+w)<100$.

It is also within the scope of the invention to detect an X-ray diffraction pattern of the composition of matter.

The following experimental examples demonstrate the process more specifically and support the claims of the present invention. The experiments are cited only as examples and not by way limitation, and the scope of the invention is not in any way restricted or limited by these examples.

Example 1

A blank or control run was made without any cationic exchanger material. Into a well-cleaned 250 mL gas washing flask 7, 150 mL of previously boiled and room temperature tempered demineralized water was added. The on/off valve 4 was opened, a stream of nitrogen gas coming from source 2 at a pressure of 14 psig was allowed to flow at a rate of at least 250 mL/min, and a gas diffusor (8) was introduced into the flask 7. The time of nitrogen flowing was at least 5 minutes. Then a change in three-way valve 3 allows a 14 psig carbon dioxide gas flow from source 1 at a rate of at least 250 mL/min. The carbon dioxide gas flow time was 30 minutes at room temperature.

The amount of the bicarbonate (as anion) formed was 238 mg/L using the analytical procedure previously mentioned.

Example 2

Figure 4:
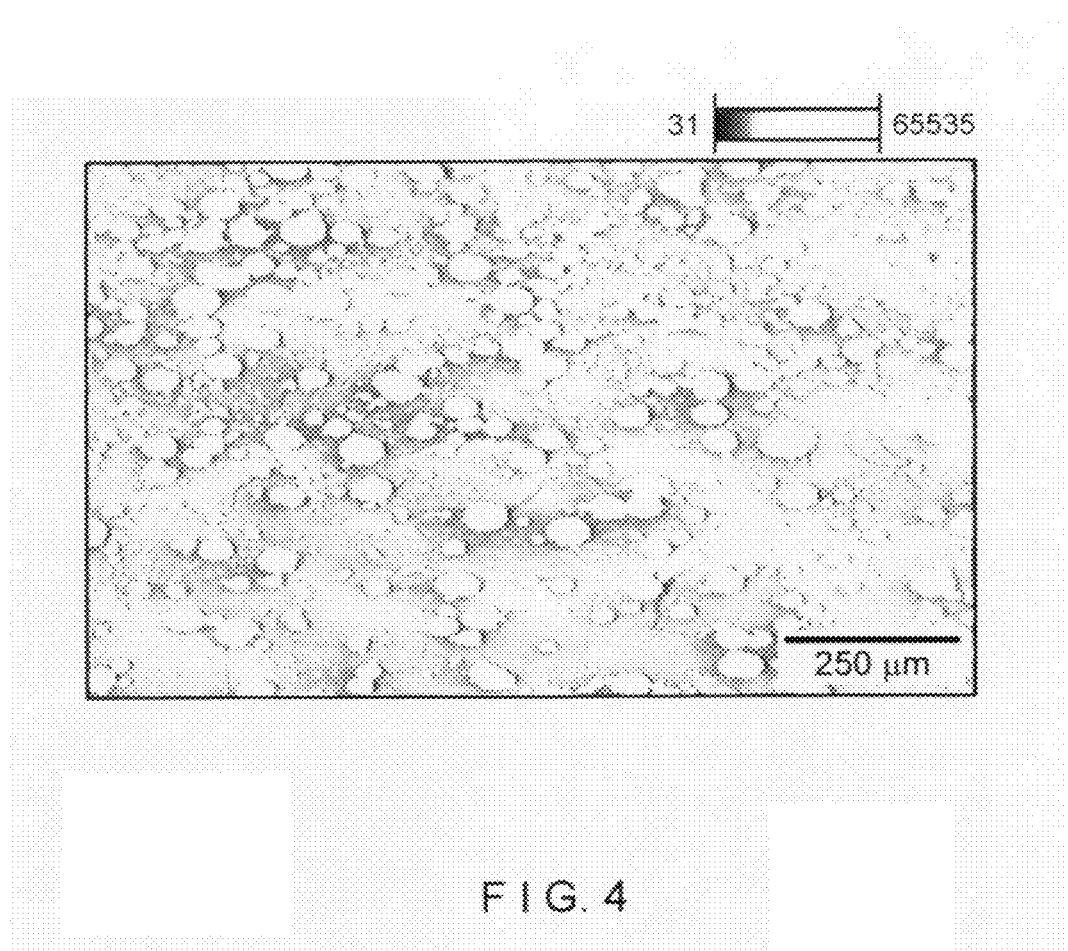
FIG. 4 is a scanning electron microscope image similar to the image in FIG. 3 but on a smaller scale.

In this example an XC sodium form cationic exchanger material was examined. This is a commercial microsphere of faujasite type X zeolite, whose X ray diffraction pattern is shown in FIG. 2. The silicon-to-aluminum (mol/mol) ratio given by chemical analysis and specific BET surface area (S) is shown in table 1 of example 3. FIG. 3 presents a picture of scanning electron microscopy displaying a general view of microspheres of XC material, ranging in size between roughly 5 μm and 100 μm. FIG. 4 shows a picture of scanning electron microscopy of the microspheres of this XC cationic exchanger material.

Into a well-cleaned gas washing flask 7, a mass of cationic exchanger material XC was charged, and the procedure described in example 1 was carried out. The carbon dioxide gas flow time was also 30 minutes.

Using the analytical procedure previously mentioned, the amount of the bicarbonate (as anion) formed was 427 mg/L, and the phenolphthalein test for carbonate was negative.

This cationic exchanger material used in accordance with the invention is the one with the lowest yield of sodium bicarbonate of all cationic exchanger materials tested; however, the yield is almost twice that of the blank or control run, indicating that the equilibrium toward the formation of bicarbonate is shifted by the introduction of a cationic exchanger material into the aqueous media, where simultaneously dissolution of carbon dioxide is taking place.

Example 3

This example examines various sodium-form cationic exchanger materials of the aluminosilicate type. Besides the

Figure 6:
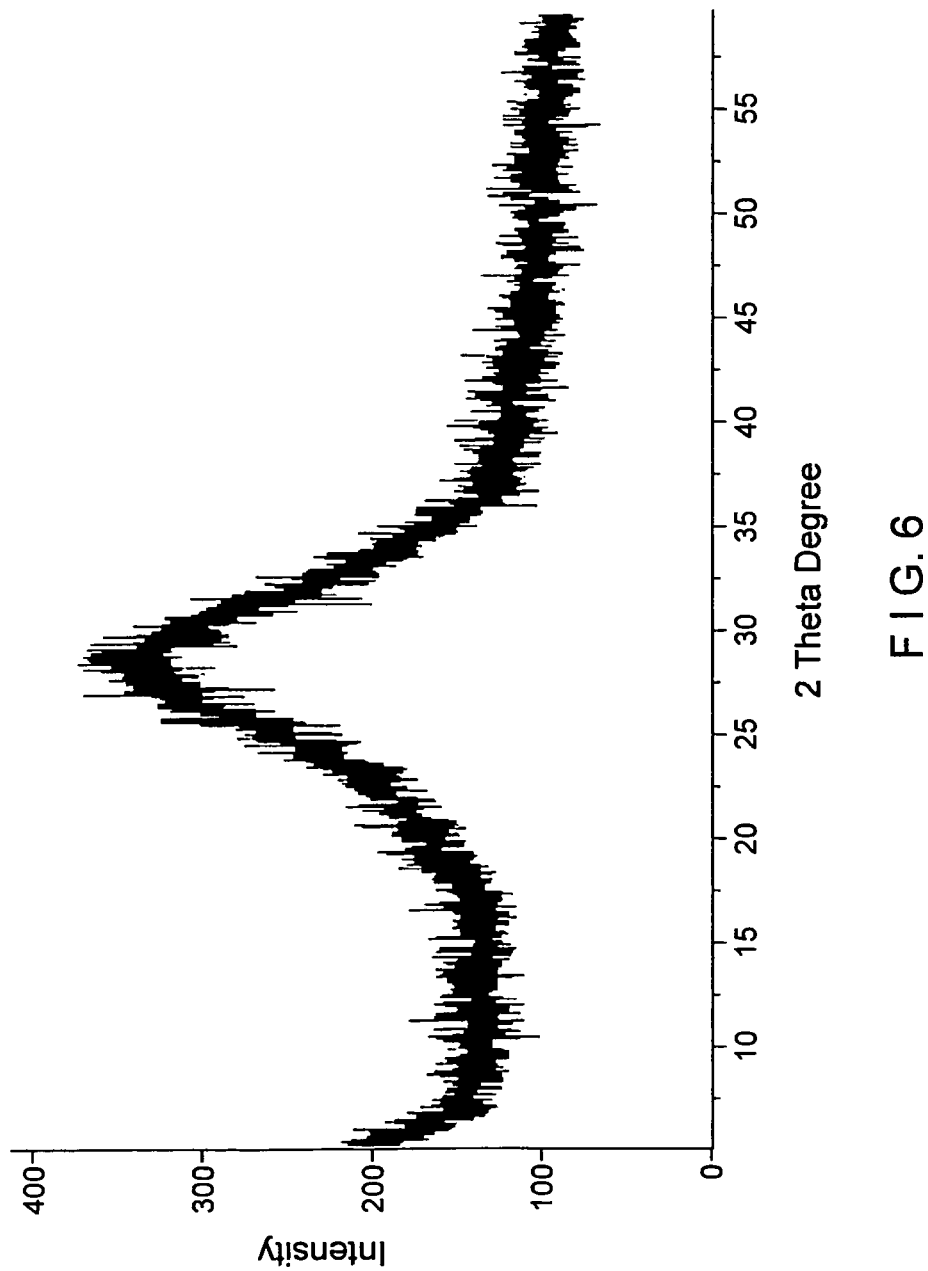
FIG. 6 shows the X-ray diffraction pattern of an AX cationic exchange material.
Figure 8:
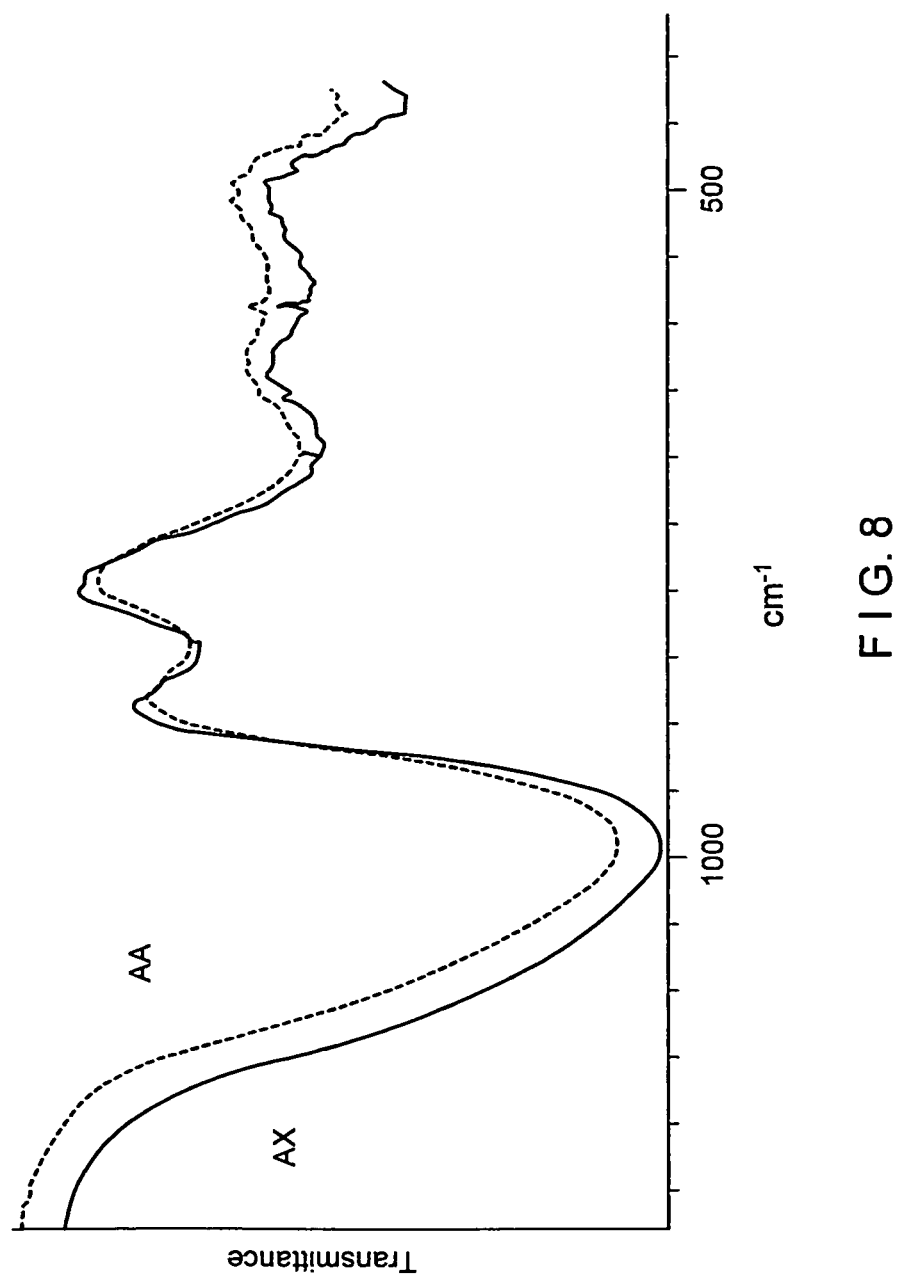
FIG. 8 shows the FT-infrared spectra of AA and AX cationic exchange materials.

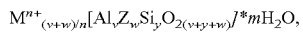

cationic exchange describe in example 2, the characteristics of others are shown in Table 1 below. FIG. 5 shows an X-ray diffraction pattern of the AC material, which represents a typical A zeolite. The AC material comprises a set of microspheres with a size distribution similar to that shown in FIG. 3. The AA and AX materials are both X-ray amorphous materials whose patterns are shown in FIG. 6 and FIG. 7 respectively. These materials are obtained from gels typical for synthesis of zeolites A and X respectively, but their syntheses were quenched before the crystal growth stages to obtain small nuclei and so a greater external surface. FIG. 8 shows the infrared spectra of AA and AX materials in the framework range of zeolite 380 cm−1 to 1300 cm−1. They display some bands of a typical IR pattern for zeolites, showing that a small range ordering exists in both materials. Their absorption pattern is characterized by the following frequency ranges in $cm^{-1}$: 1300 $cm^{-1}$-900 $cm^{-1}$, very strong; 900 $cm^{-1}$-800 $cm^{-1}$ medium; 750 $cm^{-1}$-650 $cm^{-1}$, medium; 650 $cm^{-1}$-520 $cm^{-1}$ weak; 500 $cm^{-1}$-420 $cm^{-1}$ medium.

Each of these materials was examined following the procedure used in example 2. The mass of cationic exchange material used for the evaluation ranges between 6 g and 9 g, and was determined as described above, according to CEC and LOI parameters. For each material, the run times are 5, 15 and 30 minutes. In all of the cases examined, the phenolphthalein test for carbonate was negative, which indicates that these materials are selective to produce sodium bicarbonate. The sodium bicarbonate yields in each case are shown in FIG. 9. It is noted that the equilibrium toward the formation of bicarbonate is shifted by the introduction of a cationic exchange material in the aqueous media, where simultaneously dissolution of carbon dioxide is taking place. The AA material produces the best results. Surprisingly, the amorphous materials AC and AX produce a better yield of sodium bicarbonate than do well crystallized materials and much more than does the mere bubbling of carbon dioxide in water shown in example 1.

This is not intended to give a definitive explication, but it is possible that diffusion problems of carbon dioxide gas into internal surfaces of the nanopores of these crystalline materials or into embedded exchanging sites in the bulk of the amorphous materials prevent the achievement of the expected total conversion of the CEC of each material. The sodium bicarbonate yield seems to be related to the abundance of aluminum in the external surface area of these cationic exchange materials. The equilibrium shifting from carbon dioxide gas to bicarbonate by cationic exchanger materials is real, but availability of the exchanging sites is also important.

TABLE 1

| Material | Si/Al (mol/mol) | CEC (meq/g) | Crystallinity | S BET (m2/g) | S external (m2/g) |
|---|---|---|---|---|---|
| AC | 1.3 | 6.2 | A zeolite Type | 8 | 4 |
| XC | 1.7 | 4.5 | X zeolite type | 770 | 11 |
| AA | 1.4 | 5.6 | Amorphous | 55 | 32 |
| XA | 1.8 | 5.7 | Amorphous | 38 | 21 |

Example 4

Figure 10:
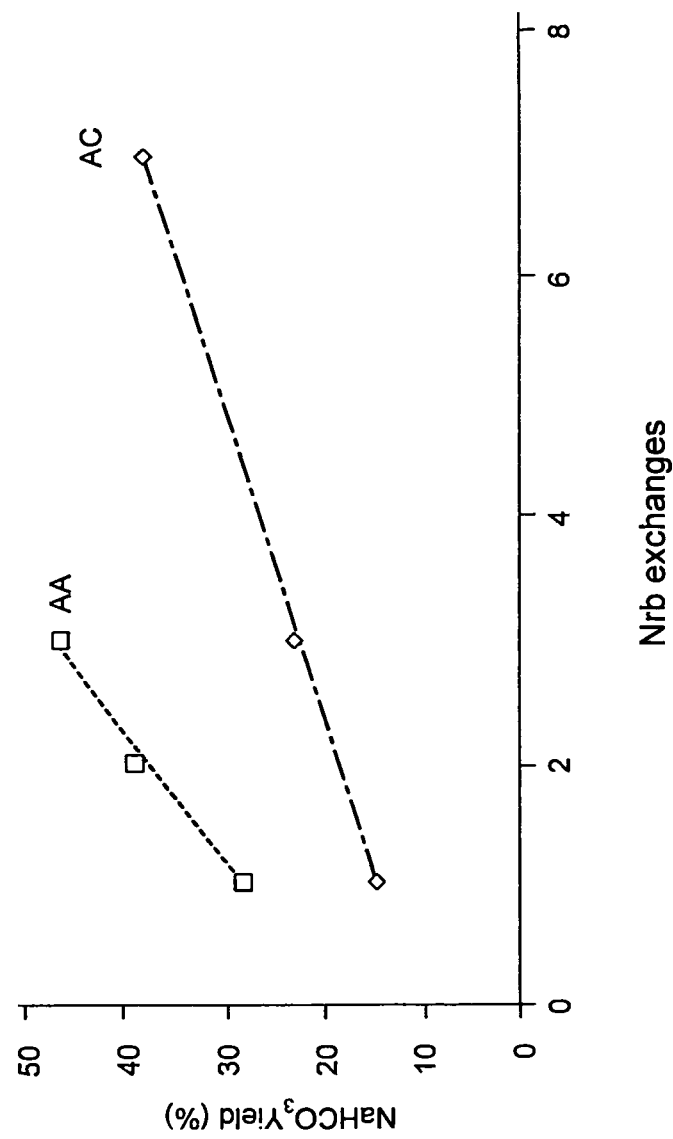
FIG. 10 shows the sodium bicarbonate yields for AA and AC materials as a function of the number of cationic exchange cycles.

In this example, cationic exchanger materials selected from example 3 are used in successive cycles of cationic exchange with carbonic acid followed by intermediate regeneration with a sodium chloride solution. The idea is to determine the enrichment in sodium bicarbonate for each cycle, keeping in each cycle the same amount of original mother liquor used at the beginning. The selected materials are AC and AA. The characteristics of these materials are described in example 3. The procedure for carbonic acid exchange is the same as in example 1. The carbonic acid exchange run time was 30 min for each cycle. The procedure for the regeneration step is described above. The regeneration was carried out using a solution of sodium chloride with 2 times the miliequivalents of the mass of used cationic exchanger material, a liquid-to-solid ratio of 2, a temperature of 40° C., and 30 minutes of regeneration time. After that, the material was dried at 100° C. for 2 hrs. To keep the same mass of cationic exchanger material, a small makeup (around 100 mg) was done before beginning a new acid carbonic exchange cycle. In each cycle, an aliquot of 20 ml was removed from the mother liquor for sodium bicarbonate analysis. This aliquot was replaced by adding the same volume of a sodium bicarbonate solution. The replacement volume has the same mass of sodium bicarbonate as the removed aliquot. The enrichment of sodium bicarbonate for each cycle is shown in FIG. 10.

In the case of both cationic exchanger materials, there was an increase of the amount of sodium bicarbonate after each cycle, which shows that a regeneration of the used exchanging sites takes place in the case of each material. The relative efficiency of sodium bicarbonate production was the same as that observed in FIG. 9 and example 3, where the yield of AA material was greater than that of AC at 30 min of cationic exchanger with carbonic acid. The slopes of the graphs shown in FIG. 10 represent the percentage increase in sodium bicarbonate yield by cycle, which for AA and AC materials are about 9.15 and 3.87, respectively. Perhaps the equilibrium condition between carbon dioxide with a sodium bicarbonate solution limits the yield, but still carbon dioxide to bicarbonate equilibrium shifting by the cationic exchanger materials was observed. This indicates that it is possible that 100% yield can be attained by using successive cycles with regeneration cycles in between.

Example 5

This example uses the procedure of example 2, except that, instead of using fresh demineralized water, a solution of 2.5 g of sodium bicarbonate analytical grade in 150 ml of demineralized water was prepared, and a mass of regenerated AC material was introduced after the $7^{th}$ cycle. This was done in order to simulate the number of cycles necessary to achieve 100% yield of sodium bicarbonate. An increase of 3.79% over the amount of sodium bicarbonate in solution was obtained, in good agreement with what is expected from the slope of the AC line in FIG. 9 and example 4. It shows that the regenerated cation exchanger material can be used again after several cycles.

Example 6

A mass of regenerated AA material after the $3^{rd}$ cycle of example 4 (FIG. 9) was evaluated with 150 ml of fresh demineralized water following the procedure of example 2. A yield of 27% was obtained, which is very close to the result obtained in the first cycle, indicating that regenerability is also achieved in amorphous cationic exchanger materials.

Example 7

In this example, the sodium bicarbonate liquor obtained in example 4 for AA material, after its separation from the liquor, was evaporated to dryness at 90° C. A powder X-ray diffraction analysis was made using Cu radiation K-Alpha1

Figure 11:
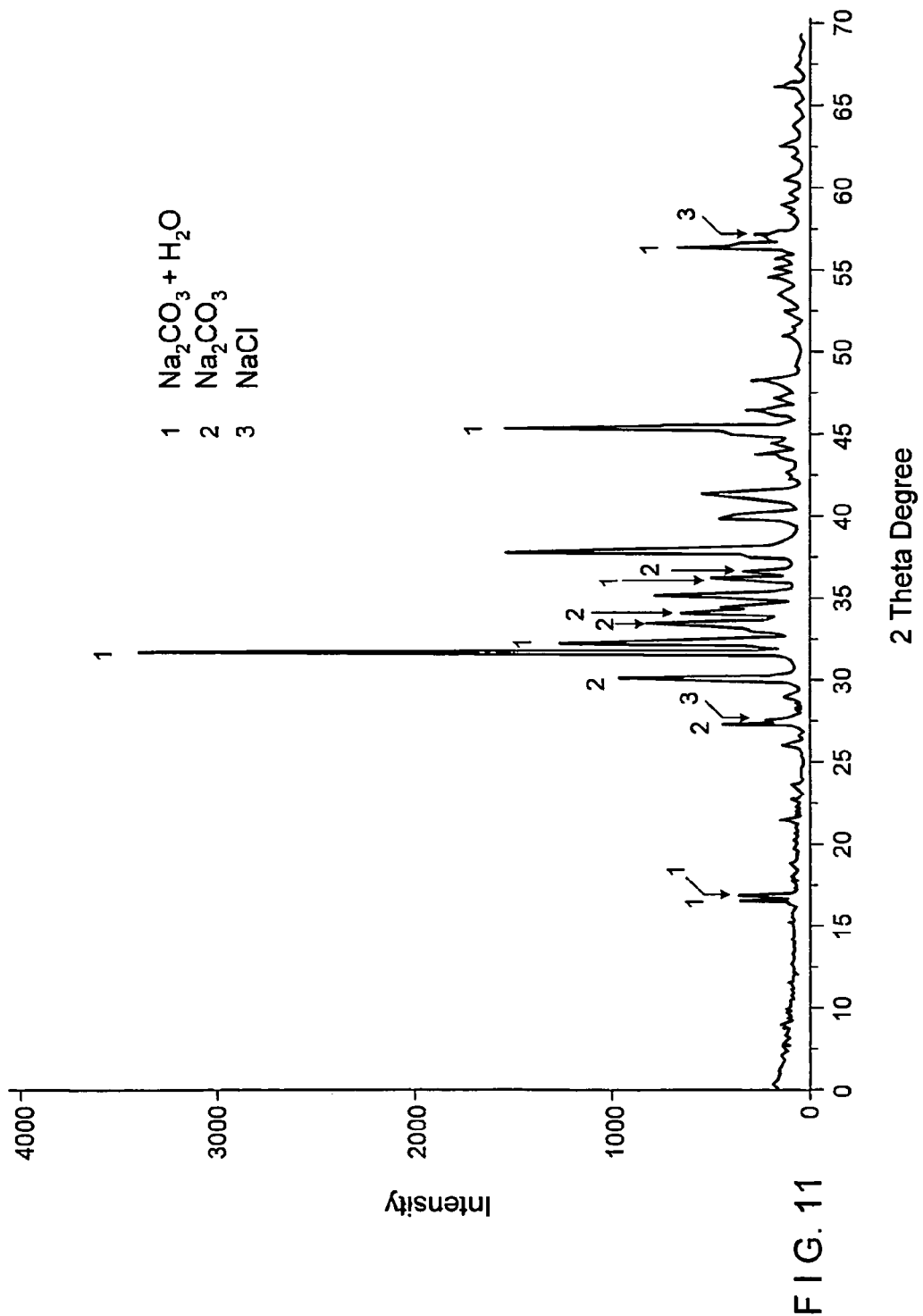
FIG. 11 shows the X-ray diffraction pattern of a mixture of thermonatrite ($Na_2CO_3 \cdot H_2O$) and Sodium carbonate ($Na_2CO_3$)

[Å] 1,54060. The obtained diffraction pattern is presented in FIG. 11. The sodium chloride (NaCl) was introduced for instrumental correction in the peaks position. The rest of the peaks are identified as a mixture of sodium carbonates (thermonatrite, $Na_2CO_3 \cdot H_2O$, and sodium carbonate $Na_2CO_3$) according to the base data of the JCPDS (Join Committee of Powder Diffraction Standards) 8-448 for thermonatrite and 37-451 for sodium carbonate. This shows that solid carbonates can be obtained from a sodium bicarbonate solution using cation exchanger materials by shifting the equilibrium of carbon dioxide gas dissolution to bicarbonate.

Example 8

A mass of regenerated AA material was evaluated with 150 ml of fresh demineralized water. At a location 1,700 meters above sea level, with an absolute pressure of 0.83 atm at 27° C., a stream of ambient air at 0.47 L/min was passed through the gas-washing flask of FIG. 1. The procedure of the example 2 was followed, with a continuous run time of 24 hours. A yield of 7% of sodium bicarbonate was obtained. Considering ideal gas behavior of the carbon dioxide, it represents a capture of 30% of the total carbon dioxide introduced for the run time examined. This example shows that carbon dioxide can be removed from a mixture of gases and that by this invention atmospheric carbon dioxide can be fixed into valuable chemical commodities including carbonates, bicarbonates and acids of high quality. Also, this invention can be used as a separation method and further still as analytical method to quantify carbon dioxide provided that the miliequivalents of the cationic exchanger are not exhausted and the flow of incoming gas is conveniently adjusted. This result indicates that by scaling up this procedure it is possible simultaneously to capture and to convert at high levels atmospheric carbon dioxide in a simple, economical and safe way in any location on the planet.

Example 9

This example examines a sodium form cationic exchanger material, which is a type X zeolite whose lattice is partially isomorphously substituted with iron, that is, iron atoms as well as aluminum atoms are exchanging sites.

This material was evaluated following the procedure of example 2, and a yield of 3% was obtained. This shows that other kinds of atoms can be included in the composition of the aluminosilicate materials, provided that these atoms have a chemical tetrahedral coordination suitable for making exchanges, namely a tetrahedral structure.

Example 10

In this example an aluminium salt, aluminium trichloride ($AlCl_3$) was homogenously deposited on a surface of silica gel micro spheres whose size distribution ranges 0.8 mm-1.2 mm. This silica gel support has 300 $m^2/g$, a pore volume of 1.2 cc/g and an average pore diameter of 13 nm. After calcination, the material was put in contact with a solution of sodium chloride such that the equivalents of sodium were 1.5 times that of the aluminum. The CEC of the material was of 3.9 meq/g. A mass of 7.6 g of this material, dry basis, was evaluated for carbon dioxide conversion to sodium bicarbonate using the same procedure of the example 2, the carbon dioxide flow was 250 mL/min. The yield of sodium bicarbonate at 30 min was 57%. In comparison with the results of the crystalline materials of the example 2, there is a improvement in the yield of the bicarbonate, which pointing to a better exposure of the exchanging site to the carbonic acid in this cationic exchanger material.

Example 11

In this example, a cation exchanger material with the same characteristics of the example 8 was evaluated for carbon dioxide conversion to sodium bicarbonate using the same procedure of the example 10. This time suspending the material in 150 mL of spring water with the following composition:
Calcium=96 mg/L; Sodium=10.60 mg/L; Magnesium=6.1 mg/L; Potassium=3.7 mg/L; Bicarbonate=297 mg/L; Chlorine=22.6 mg/L; Sulfate=9.3 mg/L; pH=7.2. The net yield of sodium bicarbonate was 30%. This indicates that besides demineralized water, at least some mineral spring water can be used in this invention.

Example 12

In this example, an amount of XC material, whose properties are said in table 1, is ionic exchange with a solution of potassium chloride 1,5 times the miliequivalents of the sodium at XC material mass. The ionic exchange was carried out with a liquid-to-solid ratio of 2, a temperature of 40° C., and 30 minutes of exchanging time. After that, the material was dried at 100° C. for 2 hrs. In this way a potassium XC material is obtained. This material was examined for carbon dioxide conversion according to the procedures said in the example 2. A yield of 4% of sodium bicarbonate was obtained. This shows that other alkaline metals than sodium in the cationic exchanger material can end as a bicarbonate in solution.

Example 13

In this example, an amount of AC material, whose properties are indicated in table 1, is ionically exchanged with a solution of calcium chloride once the miliequivalents of the sodium at AC material mass. The ionic exchange was carried out with a liquid-to-solid ratio of 2, a temperature of 40° C., and 30 minutes of exchanging time. After that, the material was dried at 100° C. for 2 hrs. In this way a calcium AC material is obtained. This material was examined for carbon dioxide conversion according to the procedures set out in the example 2. A yield of 10% of calcium bicarbonate was obtained. This shows that an alkaline earth metal on the cationic exchanger material can end as a bicarbonate in solution. However it is recognized that calcium bicarbonate exists only in aqueous solution and is not known as a solid phase.

CONCLUSION

The ammonia-soda process has been well established since the end of nineteenth century to produce massively synthetic sodium bicarbonate. To our knowledge there is no known process that takes advantage of the faster and simpler cationic exchange mechanism to produce, in a single step, significant amounts of a synthetic alkaline bicarbonate and/or earth alkaline bicarbonate solution with a suitable concentration and purity to crystallize alkaline bicarbonates or any other alkaline carbonates and their mixture, or earth alkaline carbonate. Perhaps the low solubility of carbon dioxide in pure water (0.034 mol/L) at 25° C. and 1 atm, the very low rate of carbon dioxide hydratation reaction, versus the high rate of dehydratation of the carbonic acid ($H_2CO_3$) (according to equation 1), all of which mean that in a solution of carbon dioxide in water, only about 0.1% exists in the form of carbonic acid, and the relative small value of the first acidity constant ($pK_1=3.4$) have discouraged the bicarbonate-carbonate industry from looking at other possibilities based on cationic exchange. In any case, despite these seeming physical-chemical impediments, this invention demonstrates that contacting an insoluble alkali metal or earth alkaline form of an inorganic cationic exchanger material within an aqueous medium where carbon dioxide gas is introduced or generated shifts the carbon dioxide dissolution equilibrium toward bicarbonate production.

It is not obvious that both of the problems noted above excess carbon dioxide being released into the atmosphere and the lack of an ecologically friendly and inexpensive process for the manufacture of alkaline bicarbonates or alkaline earth bicarbonates can be addressed by a single manufacturing process; yet that is exactly what the present invention accomplishes.

The processes disclosed herein are different embodiments of our invention. Many modifications of these processes will occur to those skilled in the art upon consideration of this disclosure. The invention is not limited to the disclosed processes but includes all such modifications thereof as fall within the scope of the appended claims.

The invention claimed is:

1. A process for making aqueous solutions of alkaline bicarbonates and/or alkaline earth bicarbonates comprising the steps of: dissolving gaseous carbon dioxide in water to produce an aqueous solution containing bicarbonates, $HCO_3^-$; and further containing hydronium cations, $H_3O^+$, introducing a solid cationic exchanger material $[(M_{x/n}^{+n})E_x^-]$ to capture the hydronium cations, $H_3O^+$ and produce used cationic exchanger material $[(H_3O^+)_xE_x^-]$, according to:

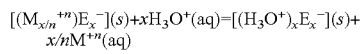

where "X" stands for a molar amount of anionic centers of charge of the cationic exchanger material $[(M_{x/n}^{+n})E_x^-]$ balanced by x/n molar amount of non framework metal M, "n" stands for the metal valence, and "M" is selected from the group consisting of Group 1A and Group 2A of the periodic table of elements; whereby the capture of the hydronium cations, $H_3O^+$, increases the yield of the bicarbonates, and regenerating the used cationic exchanger material, $[(H_3O^+)_xE_x^-]$, by ion exchange with an unsaturated solution of ionic salt of metal $M^{+n}$ such that the equivalents of the metal $M^{+n}$ is at least 0.5 times the equivalents of $E_x^-$.

2. A process according to claim 1 wherein the regenerating step is performed by ion exchange with an unsaturated solution of ionic salt of metal $M^{+n}$, and comprising replacing hydronium cations, $H_3O^+$, in the used cationic exchanger material $[(H_3O^+)_xE_x^-]$, by fresh $M^{+n}$ cations, making the used exchanger material $[(H_3O^+)_xE_x^-]$ suitable for recycling.

3. A process according to claim 1 wherein the regenerating step is performed by ion exchange with an unsaturated solution of ionic salt of metal $M^{+n}$, and comprising replacing hydronium cations, $H_3O^+$, in the used cationic exchanger material $[(H_3O^+)_xE_x^-]$, by fresh $M^{+n}$ cations, making the used exchanger material $[(H_3O^+)_xE_x^-]$ suitable for recycling according to:

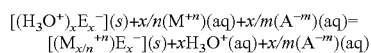

where $A^{-m}$ stands for the anion of valence "m" selected from the group consisting of chloride, sulfate, nitrate, α-hydroxy carboxylate, o-hydroxybenzoate, amine, polyphosphate and hexametaphosphate.

4. A process according to claim 1 comprising the step of passing the aqueous solution of bicarbonates through a crystallization process to produce a precipitate of alkaline bicarbonates and/or alkaline carbonates.

5. A process according to claim 4 comprising washing and drying the precipitate.

6. A process according to claim 1 comprising employing, as cationic exchanger material, a composition of matter having a cation exchange capacity greater than 0.001 miliequivalents per gram dry basis, and/or with a specific surface at least 0.1 m²/g.

7. A process according to claim 6 comprising employing, as cationic exchange material, a silicoaluminate or substituted silicoaluminate

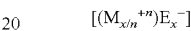

represented by the general empirical formula

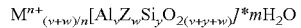

where: "v" stands for the molar ratio of the anionic centers of tetrahedral aluminum, "w" stands for the molar ratio of tetrahedral anionic centers "Z", wherein "Z" stands for all elements of the first transition metals series, Zr, Nb, and elements from groups 5A and 3A of the periodic table, "y" stands for the molar ratio of non anionic centers of tetrahedral silicon, $(v_++w)/n$ is the number of exchangeable cations of valence n, and "m" stands for the number of water molecules adsorbed on external and internal surfaces of the solid cationic exchanger material, so that: v+w≠0; v+w≤y and y/(v+w)<100.

8. A process according to claim 7 comprising detecting an X-ray diffraction pattern of the composition of matter.

9. A process according to claim 1 comprising employing, as cationic exchanger material $[(M_{x/n}^{+n})E_x^-]$, synthetic or natural alkaline and/or alkaline earth LTA zeolite and sodium zeolites selected from the group consisting of faujasite, zeolite X, zeolite Y, zeolite P, clinoptilolite, mordenite, ZSM-5, mutinaite, feldspar, expansible clay, bentonite, montmorillonite, and mixtures thereof.

10. A process according to claim 1 further comprising augmenting the activity of cationic exchange material $[(M_{x/n}^{+n})E_x^-]$ by introducing into the aqueous solution solid material selected from the group consisting of silica, alumina, titania, zirconia, iron oxide, and mixtures thereof having a specific surface area of at least 0.1 m²/g.

11. A process comprising the steps of:
dissolving gaseous carbon dioxide in water according to the following reactions:

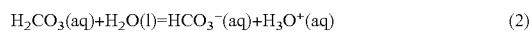

where reactions (2) and (3) both yield aqueous media containing hydronium cations, $H_3O^+$, which are exchanged in the aqueous media, and introducing a cationic exchanger material $[(M_{x/n}^{+n})E_x^-]$ into the aqueous media, where equilibriums of carbon dioxide dissolution take place and the hydronium cations, $H_3O^+$, are captured by the cationic exchanger material $[(M_{x/n}^{+n})E_x^-]$ and produce used cationic exchanger material $[(H_3O^+)_xE_x^-]$ according to:

$$[(M_{x/n}{}^{+n})E_x{}^-](s)+xH_3O^+(aq)=[(H_3O^+)_xE_x{}^-](s)+ x/nM^{+n}(aq) \qquad (4)$$

where "x" stands for a molar amount of anionic centers of charge of the cationic exchanger material $[(M_{x/n}{}^{+n})E_x{}^-]$ balanced by x/n molar amount of metal M, "n" stands for metal valence, and "M" is selected from Group 1A or Group 2A of the periodic table of elements, and regenerating the used cationic exchanger material $[(H_3O^+)_x E_x{}^-]$ by ion exchange with an unsaturated solution of ionic salt of metal $M^{+n}$, replacing hydronium cations, $H_3O^+$, in the used cationic exchanger material $[(H_3O^+)_x E_x{}^-]$ by fresh $M^{+n}$ cations, according to $$[(H_3O^+)_xE_x{}^-](s)+x/n(M^{+n})(aq)+x/m(A^{-m})(aq)= [(M_{x/n}{}^{+n})E_x{}^-](s)+xH_3O^+(aq)+x/mA^{-m}(aq) \qquad (7)$$

where $A^{-m}$ stands for the anion of valence "m" selected from the group consisting of chloride, sulfate, nitrate, α-hydroxy carboxylate, o-hydroxybenzoate, amine, polyphosphate and hexametaphosphate.

12. A process according to claim 11 comprising the step of combining the bicarbonate with aqueous alkaline metal species, $M^{+n}$, to produce an aqueous solution of alkaline bicarbonate or alkaline earth bicarbonate according to:

$$M^{+n}(aq)+nHCO_3{}^-(aq)=M^{+n}(HCO_3{}^-)_n(aq). \qquad (5)$$

13. A process according to claim 12 comprising the step of separating the aqueous solution of alkaline bicarbonate or alkaline earth bicarbonate from the cationic exchanger material.

14. A process according to claim 12 where the cationic exchanger material is stripped at least once with a stream of water at a temperature between 10° C. and 90° C.

15. A process according to claim 11 where the cationic exchanger material is stripped at least once with a stream of water at a temperature between 10° C. and 90° C.

16. A process according to claim 13 comprising the step of passing the aqueous solution of alkaline bicarbonate or alkaline earth bicarbonate through a crystallization process to produce a precipitate of alkaline bicarbonate and/or alkaline carbonate, or alkaline earth carbonate.

17. A process according to claim 16 comprising the steps of washing and drying the precipitate.

18. A process for producing solid alkaline bicarbonate and/or alkaline earth carbonate, comprising the steps of:
contacting an aqueous suspension of a cationic exchanger material with a stream of carbon dioxide in an amount and for a time sufficient to cause carbon dioxide to dissolve in the aqueous suspension to produce hydronium cations ($H_3O^+$) and alkaline and/or alkaline earth bicarbonate anions ($HCO_3{}^-$);
whereby the cationic exchanger material takes up hydronium cations ($H_3O^+$) from the aqueous suspension and releases alkaline cations and/or alkaline earth cations to the aqueous suspension, thereby becoming used cationic exchanger material;
separating liquid from the used cationic exchanger material;
precipitating solid alkaline bicarbonate and/or alkaline carbonate, or alkaline earth carbonate from the liquid, and regenerating the used cationic exchanger material, $[(H_3O^+)_xE_x{}^-]$, by ion exchange with an unsaturated solution of ionic salt of metal $M^{+n}$, where "n" stands for the metal valence, and "M" is selected from the group consisting of Group 1A and Group 2A of the periodic table of elements, such that the equivalents of the metal $M^{+n}$ is at least 0.5 times the equivalents of $E_x{}^-$.

19. A process comprising the steps of:
dissolving gaseous carbon dioxide in water according to the following reactions:

$$CO_2(g)+H_2O(l)=H_2CO_3(aq) \qquad (1)$$

$$H_2CO_3(aq)+H_2O(l)=HCO_3{}^-(aq)+H_3O^+(aq) \qquad (2)$$

$$HCO_3{}^-(aq)+H_2O(l)=CO_3{}^=(aq)+H_3O^+(aq) \qquad (3)$$

where reactions (2) and (3) both yield aqueous media containing hydronium cations, $H_3O^+$, which are exchanged in the aqueous media, and introducing a cationic exchanger material $[(M_{x/n}{}^{+n})E_x{}^-]$ into the aqueous media, where equilibriums of carbon dioxide dissolution take place and the hydronium cations, $H_3O^+$, are captured by the cationic exchanger material $[(M_{x/n}{}^{+n})E_x{}^-]$ and produce used cationic exchanger material $[(H_3O^+)_xE_x{}^-]$ according to:

$$[(M_{x/n}{}^{+n})E_x{}^-](s)+xH_3O^+(aq)=[(H_3O^+)_xE_x{}^-](s)+x/nM^+{}_n(aq) \qquad (4)$$

where "x" stands for a molar amount of anionic centers of charge of the cationic exchanger material $[(M_{x/n}{}^{+n})E_x{}^-]$ balanced by x/n molar amount of metal M, "n" stands for metal valence, and "M" is selected from Group 1A or Group 2A of the periodic table of elements, and regenerating the used cationic exchanger material $[(H_3O^+)_x E_x{}^-]$ by ion exchange with an unsaturated solution of ionic salt of metal $M^{+n}$, replacing hydronium cations, $H_3O^+$, in the used cationic exchanger material $[(H_3O^+)_x E_x{}^-]$ by fresh $M^{+n}$ cations.

\* \* \* \* \*